United States Patent [19]
Taga et al.

[11] Patent Number: 5,238,692
[45] Date of Patent: Aug. 24, 1993

[54] PROCESS FOR PRODUCING BAKED CONFECTIONERY PRODUCT WITH AT LEAST ONE GREEN LEAF ATTACHED THERETO

[75] Inventors: Kazumitsu Taga; Akio Sakurai; Yasuhiro Kamata; Yutaka Taneda; Chikako Hioka, all of Higashiosaka, Japan

[73] Assignee: House Food Industries Co., Ltd., Osaka, Japan

[21] Appl. No.: 905,211

[22] Filed: Jun. 29, 1992

Related U.S. Application Data

[63] Continuation of Ser. No. 663,531, Mar. 4, 1991, abandoned.

[30] Foreign Application Priority Data

Mar. 5, 1990 [JP] Japan .................................. 2-51795
Mar. 6, 1990 [JP] Japan .................................. 2-52671

[51] Int. Cl.⁵ .................................................. A23B 4/10
[52] U.S. Cl. .................................. 426/274; 426/275; 426/297; 426/302; 426/305; 426/383; 426/419; 426/496; 426/508
[58] Field of Search ............... 426/274, 275, 297, 302, 426/305, 383, 419, 496, 508

[56] References Cited

PUBLICATIONS

Child et al. Mastering the Art of French Cooking vol. 1, 1961, Alfred A. Knopf, Inc. pp. 546 and 574.
Claiborne et al., 1970, Classic French Cooking, Time–Life Books, N.Y. pp. 71 and 152.

Primary Examiner—Jeanette Hunter
Assistant Examiner—Helen F. Pratt
Attorney, Agent, or Firm—Armstrong, Westerman, Hattori, McLeland & Naughton

[57] ABSTRACT

Green plant leaves (herbs) are blanched with an aqueous medium having a pH of 6.5 to 11 and heated at a temperature of 80° to 102° C. The reverse surfaces of the blanched herbs and/or the upper surfaces of dough sheet units are coated with an aqueous coating medium such as an aqueous solution of pullulan or gelatin, followed by attachment of the herbs to the dough sheet units. The dough sheet units-cum-herb(s) are baked to produce baked confectionery products with a bright green herb(s) free from the grassy smell and hardly liable to be discolored. The dough sheet units may be either of a single-layer structure or of a multi-layer structure including a vegetable-containing layer(s). According to the foregoing process, biscuits, pies, crackers, bread, etc. with a healthy touch can be produced.

6 Claims, 5 Drawing Sheets

PROCESS FOR PRODUCING BAKED CONFECTIONERY PRODUCT WITH AT LEAST ONE GREEN LEAF ATTACHED THERETO

This application is a continuation of application Ser. No. 663,531 filed Mar. 4, 1991 (now abandoned).

BACKGROUND OF THE INVENTION

Field of the Invention

The present invention relates to a process for producing a baked confectionery product with a healthy touch, and more particularly to a process for producing a baked confectionery product with at least one bright green plant leaf (hereinafter referred to simply as a "herb") firmly adhered to the surface thereof. The term "baked confectionery product" used in the instant specification is intended to encompass biscuits, pies, cookies, crackers, bread and the like.

Prior Art

There have heretofore been no such baked confectionery products as biscuits, pies and crackers which have a green plant leaf adhered thereto. This is so because attachment, after baking, of plant leaves to baked products entails such poor adhesion therebetween that the leaves may be peeled off the baked confectionery products in the course of distribution or eating of the products, or because baking of dough sheet units after attachment thereto of green plant leaves entails loss of the bright green color of the plant leaves due to high temperatures during the baking, though the leaves are firmly adhered to the resulting baked confectionery products. Additionally stated, the term "dough sheet unit" used in the instant specification is intended to correspond to one baked confectionery product such as one biscuit, one pie or one cracker.

An object of the present invention is to provide a process for producing a baked confectionery product of fine flavor with at least one plant leaf of a bright green color firmly adhered to the surface thereof.

SUMMARY OF THE INVENTION

The authors of the present invention have found out that the above-mentioned object can be attained by attaching herbs subjected to a discoloration-proofing pretreatment to the surfaces of dough sheet units and baking the dough sheet units-cum-herb(s). The present invention has been completed based on this finding.

More specifically, in accordance with the present invention, there is provided a process for producing a baked confectionery product with at least one green plant leaf attached thereto, comprising the step of blanching a herb or herbs with an aqueous medium having a pH of 6.5 to 11 and heated at a temperature of 80° to 102° C., the step of coating the upper surface of a dough sheet unit and/or the reverse surface(s) of the blanched herb or herbs with an aqueous coating medium such as an aqueous solution of pullulan or gelatin in particular, the step of attaching the herb or herbs to the dough sheet unit, and the step of baking the dough sheet unit-cum-herb(s).

In the present invention, the dough is used to produce biscuits, pies, cookies, crackers, bread or the like. The water content of the dough is preferably 10 to 35 wt. %.

Where the dough is a biscuit dough, the composition of the dough may be, for example, as follows.

| flour | 30–65 wt. % |
| --- | --- |
| sweetener | 15–30 wt. % |
| fats | 10–40 wt. % |
| egg | 1–17 wt. % |
| powdered milk | 0–4 wt. % |
| table salt | 0–2 wt. % |
| baking powder | 0–3 wt. % |

In this case, the dough can be prepared, for example, according to a creaming method. The specific procedure of this method is as follows. Fats are kneaded to be softened, followed by addition thereto of a sweetener. The resulting mixture is agitated, followed by addition thereto of egg. The resulting mixture is agitated and then admixed with flour, powdered milk, table salt, a baking powder, etc. The resulting composition is formed into a sheet having a thickness of 2 to 10 mm. Besides the foregoing creaming method, a blending method and a one stage mixing method can be employed. Examples of the sweetener include various sugars such as sucrose and thick malt syrup, and various artificial sweeteners. If necessary, an emulsifier and/or the like may be further added to the foregoing composition. Examples of the emulsifier include fatty acid esters of sucrose, lecithin, fatty acid esters of glycerin, fatty acid esters of polyglycerin, fatty acid esters of propylene glycol, and fatty acid esters of sorbitan.

Where the dough is a French pie dough, the composition of the dough may be, for example, as follows.

| flour | 35–45 wt. % |
| --- | --- |
| sweetener | 0–4 wt. % |
| table salt | 0.1–1.5 wt. % |
| water | 15–25 wt. % |
| fats | 30–47 wt. % |

In addition to the above-mentioned ingredients, an amino acid or its salt such as sodium glutamate and/or a flavor may be added as a seasoning ingredient to the foregoing composition. The above-mentioned French pie dough can be prepared, for example, by the following procedure.

Flour, table salt, water and part of fats are kneaded together, and then milled into a sheet having a thickness of 20 to 30 mm. The rest of the fats are placed on the surface of the sheet, which is then folded in three, four or the like. Thereafter, the folded sheet is rolled into a sheet having a thickness of 2 to 30 mm, which is then folded in three, four or the like. The foregoing folding operation is repeated two to four times to form a dough sheet. Additionally stated, the sheet in process is preferably put at rest in a cool place such as the inside of a refrigerator midway through the repetition of the folding operations to make the resulting pies better.

Where the dough is an American pie dough, the composition of the dough may be, for example, as follows.

| flour | 35–55 wt. % |
| --- | --- |
| sweetener | 0–4 wt. % |
| table salt | 0.1–2 wt. % |
| water | 13–30 wt. % |
| fats | 20–45 wt. % |

In this case, the above-mentioned ingredients are mixed together into a dough at a low rate of agitation for a short period of time in order to hold down excessive development of the viscosity of the dough, which is attributed to gluten contained in flour.

Additionally stated, the thickness of the dough sheets of pies is preferably 0.5 to 3 mm, more preferably 1 to 2 mm, from the viewpoint of the easiness of eating the pies as well as the appearance of the pies.

As another specific example of the dough, the composition of a cracker dough will be exemplified.

| flour | 35–65 wt. % |
| --- | --- |
| yeast | 0.1–1 wt. % |
| margarine | 5–30 wt. % |
| cheese | 0–15 wt. % |
| table salt | 0–1 wt. % |
| sodium bicarbonate | 0–0.5 wt. % |
| sweetener | 0–10 wt. % |
| water | 10–25 wt. % |

In this case, the dough can be prepared, for example, according to a straight dough process. Specifically, all the above-mentioned ingredients are kneaded together, followed by 1 to 20 hours of fermentation. Alternatively, a sponge and dough process may be employed. According to this process, part of flour, yeast, part of water and part of a sweetener among the above-mentioned ingredients are first mixed together and subjected to fermentation, followed by addition thereto and kneading therewith of all the rest of the above-mentioned ingredients. In either case, the thickness of the cracker dough sheets is preferably 1 to 5 mm.

In the present invention, the foregoing dough may be used either in a single-layer structure or in a multi-layer structure comprising layers of the above-mentioned dough A containing no vegetables (hereinafter often referred to as the "vegetable-free dough A") and a layer(s) of a vegetable-containing dough B.

In the multi-layer structure, the dough B is not particularly restricted in composition in so far as it contains a vegetable paste or powder. Besides the vegetable paste or powder, the dough B may comprise an appropriate ingredient(s) selected from among flour, rice flour, cornstarch, potato starch, wheat starch, sweeteners, fats, powdered milk, table salt, a baking powder, an almond powder, a coconut powder, a soybean powder, cheese, malt extract, seasonings, spices, emulsifiers, etc. Examples of the vegetable to be used in the dough B include spinach, carrots, squash, Japanese radishes, tomatoes, green peas, cauliflowers, lettuce, and sweet potatoes.

The dough B can be prepared according to a suitable method such as a one stage mixing method or a creaming method. The water content of the dough B is preferably 10 to 50 wt. %. When the water content is lower than 10 wt. %, the dough B is so weak in tack or cohesion as to be liable to crumble in pieces. When the water content exceeds 50 wt. %, the dough B is so strong in tack as to make molding thereof difficult with deteriorated workability.

The foregoing doughs A and B are preferably milled into respective sheets having a thickness of 0.5 to 10 mm. When the sheets are less than 0.5 mm in thickness, they are so thin as to be subject to rupture. When the sheets exceed 10 mm in thickness, they are so thick as to make the workability thereof deteriorated.

In this embodiment of the present invention, the foregoing two kinds of doughs are formed into a layered sheet according to a suitable process, an example of which may be a process wherein a sheet of the dough B is placed on the surface of a sheet of the dough A, followed by folding the two sheets together in three, four or the like to form a layered dough sheet. The following alternative process may also be employed. The surface of a sheet of the dough A is coated or sprayed thin with water, egg, or other aqueous solution, and a sheet of the dough B is placed and lightly pressed on the coated or sprayed surface of the sheet of the dough A to adhere the former to the latter. Thereafter, the above-mentioned sheet of the dough B is subjected to the same coating or spraying treatment as described above, and another sheet of the dough A is adhered to the above-mentioned sheet of the dough B in the same manner as described above. The foregoing procedure of alternately laminating sheets of the doughs A and B is repeated to form a layered dough sheet. In either case of the foregoing processes, the layered dough sheet is formed in such a way that the uppermost and lowermost layers of the layered dough sheet is constituted of the dough A. The number of layers is preferably 3 to 11 in total, including layers of the dough A and a layer(s) of the dough B. Since the layered dough sheet is formed in such a way as to have the layer(s) of the dough B at least sandwiched with the uppermost and lowermost layers of the dough A, the number of layers is inevitably at least 3. On the other hand, when the number of layers exceeds 11, the multi-layer structure peculiar to this embodiment of the present invention turns out to be substantially unrecognizable. The weight ratio of dough A:dough B is preferably in the range of 1:0.25 to 2 in order to secure a suitable degree of taste or flavor of the vegetable. It is preferable from the viewpoint of easiness of eating the resulting baked confectionery products as well as the appearance thereof that the layered dough sheet thus formed be rolled into a sheet having a thickness of 1 to 10 mm.

Next, attachment of the herbs to dough sheet units may be done either by attaching the herbs to a dough sheet and forming the dough sheet-cum-herbs into dough sheet units-cum-herb(s) or by forming a dough sheet into dough sheet units and attaching the herbs to the dough sheet units The formation of the dough sheet units having a desired configuration may be done by means of a cutter, a punch or the like with due consideration being given to the shape of final products. Where the dough sheet is used to produce pies or crackers, it is preferable to take, before the attachment of the herbs, an additional step of forming several fine vents, per dough sheet unit, through the dough sheet or the dough sheet units by means of a fork or the like.

In the present invention, it is preferable to use fresh herbs each having a size of 5 to 60 mm. When the size is less than 5 mm, the herbs are too small to be recognizable in a state of being adhered to final products. When the size exceeds 60 mm, the herbs are too large to be capable of providing a lovely appearance. Examples of the herbs having a size of 5 to 60 mm include those of chrysanthemums, maples, lemon bahms, sweet marjorams, marjorams, peppermints, spearmints, and oreganos. Among the above-mentioned herbs, lemon bahm and sweet marjoram herbs are especially preferable since the discoloration-suppressing effect of coating herbs with an aqueous coating medium can be remarkably manifested.

The herbs are preliminarily blanched with an aqueous medium having a pH of 6.5 to 11 and heated at a temperature of 80° to 102 ° C. The blanching treatment time is preferably 3 to 600 seconds. When the pH is lower than 6.5, when the temperature is lower than 80° C., or when the treatment time is shorter than 3 seconds, the herbs are liable to be discolored through or after baking. When the pH exceeds 11, when the temperature exceeds 102° C., or when the treatment time exceeds 600 seconds, the herbs turns too soft to straighten and then attach to the dough sheet units. The above-mentioned aqueous medium may be constituted of ether water alone, or water and a pH adjuster. Examples of the pH adjuster that may be used in the aqueous medium include sodium bicarbonate, sodium carbonate, potassium carbonate, disodium hydrogenphosphate, dipotassium hydrogenphosphate, and soduim acetate. Immediately after the blanching treatment, the herbs are preferably dipped in cool water kept at a temperature of about 10° to 25 ° C. to lower the temperature of the herbs.

Subsequently, the herbs are attached to the upper surfaces of the dough sheet units. Before that, water adhering to the herbs are preferably removed by wiping away, drying with hot air, or the like. When attachment of the herbs is done after baking of the dough sheet units instead of at this stage, the adhesion of the herbs to the baked confectionery products is so poor as to be liable to cause peeling off of the herbs in the course of distribution or eating of the baked confectionery products.

In order to ensure that the herbs will hardly be peeled off, the upper surface(s) of the dough sheet (units) and/or the reverse surfaces of the herbs are coated with an aqueous coating medium before the attachment of the herbs. Examples of the aqueous coating medium include egg, egg diluted with water, water, an aqueous solution of pullulan, an aqueous solution of gelatin, and a starch solution. Egg is especially preferred because coating with egg of the upper surface(s) of the dough sheet (units) entails a beautifully browned color of the upper surfaces of the final products.

For the purpose of preventing the herbs from peeling off the dough sheet units, it is most preferable to coat the herbs with an aqueous solution of pullulan or gelatin. Before coating the herbs with the aqueous solution of pullulan or gelatin, water adhering to the herbs is preferably removed by wiping away, drying with hot air, or the like. The pullulan or gelatin concentration of the aqueous solution is preferably 2 to 20 wt. %. When this concentration is lower than 2 wt. %, the herbs cannot satisfactorily be prevented from discoloring through or after baking. When the concentration exceeds 20 wt. %, an unnatural gloss appears on the surfaces of the herbs, while pullulan or gelatin sticks to a mouth when the resulting baked confectionery products are eaten.

While one herb is basically attached to one dough sheet unit, two or more herbs per dough sheet unit may be used when the herbs are small and/or when the dough sheet unit is large. In the case of using two or more herbs per dough sheet unit, it is preferable to avoid overlapping of the herbs in order to ensure that the herbs will hardly be peeled off, and that the appearance of the resulting baked confectionery product will not be spoiled.

After the foregoing attachment of the herbs to the dough sheet units, the dough sheet units-cum-herb(s) is baked in an oven or the like. The baking conditions may be varied, depending on the size of the formed dough sheet units. In general, the baking is favorably effected in an atmosphere kept at 150° to 250° C. for 5 to 20 minutes. When the moisture content of the baked products is high, a drying treatment thereof is prefarably effected. In this case, the drying treatment is preferably done with hot air heated up to 80° to 150° C. for 5 to 120 minutes.

The foregoing steps are taken according to the process of the present invention to produce desired baked confectionery products.

BRIEF DESCRIPTION OF THE DRAWINGS

The foregoing and other objects, features and advantages of the present invention will be better understood by reference to the following description taken in connection with the accompanying drawings, in which.

BEST MODE FOR CARRYING OUT THE INVENTION

Figure 1:
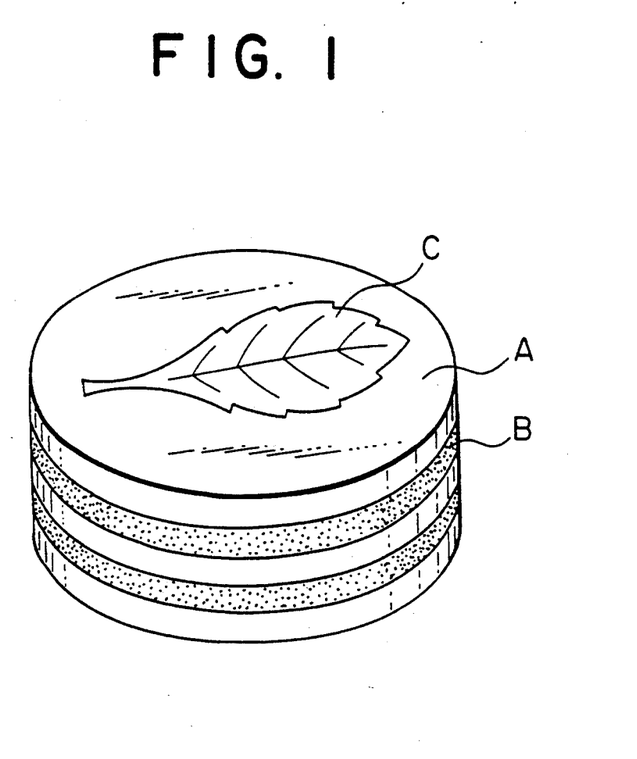
FIG. 1 is a perspective view of an example of a baked confectionery product of a multi-layer structure produced according to an embodiment of the process of the present invention.

A baked confectionery product of a multi-layer structure produced according to one embodiment of the process of the present invention is, for example, as illustrated in FIG. 1. More specifically, layers of the dough A are scorched, through baking, into a browned color peculiar to general baked confectionery products, while layers of the dough B are scorched, through baking, into a dark brown color. Thus, this baked confectionery product is constituted of the two kinds of layers differing in color, the uppermost layer of which has a herb C attached to the upper surface thereof.

The following Examples will now illustrate the present invention in more detail, but should not be construed as limiting the scope of the invention.

EXAMPLE 1 (Dough sheets of a single-layer structure)

Blanched and pullulan-coated herbs

I. Preparation of Biscuit Dough 500 g of flour and 215 g of sugar were mixed with 225 g of margarine and 65 g of egg by the creaming method. The resulting mixture was milled into a sheet having a thickness of 5 mm, which was then punched into circular dough sheet units having a diameter of 3.5 cm.

II. Blanching Treatment of Herbs

A 0.3 wt. % aqueous solution of sodium bicarbonate having a pH of 8.2 was boiled, in which 10 g of lemon bahm leaves with sprigs were dipped for one minute to effect the blanching treatment thereof, immediately followed by dipping thereof in water kept at 18° C.

III. Attachment of Herbs to Dough Sheet Units

Extra water remaining on the lemon bahm leaves was wiped away. The reverse surfaces of the lemon bahm leaves were coated with a 10 wt. % aqueous solution of pullulan, and then respectively attached to central areas of the upper surfaces of the above-mentioned circular dough sheet units.

IV. Baking

Thereafter, the dough sheet units with a lemon bahm leaf were placed inside an oven, and baked at 180° C. for 10 minutes, followed by spontaneous cooling thereof over 30 minutes. Thus, baked confectionery products A were produced.

COMPARATIVE EXAMPLE 1

Blanched but pullulan-uncoated herbs

Baked confectionery products B were produced in substantially the same manner as in Example 1 except that lemon bahm leaves blanched but not coated with the aqueous solution of pullulan were directly attached to dough sheet units.

COMPARATIVE EXAMPLE 2

Unblanched but pullulan-coated herbs

Baked confectionery products C were produced in substantially the same manner as in Example 1 except that lemon bahm leaves not blanched but coated with the aqueous solution of pullulan were attached to dough sheet units.

COMPARATIVE EXAMPLE 3

Unblanched and pullulan-uncoated herbs

Baked confectionery products D were produced in substantially the same manner as in Example 1 except that lemon bahm leaves not blanched and not coated with the aqueous solution of pullulan were directly attached to dough sheets units.

COMPARATIVE EXAMPLE 4

Herbs attached after baking

The steps of Example 1 were taken in the order of I→IV→II→III, followed by drying with hot air heated up to 100° C. for 20 minutes. Thus, baking confectionery products E were produced.

The characteristics of the baked confectionery products A to E are listed in Table 1, wherein the data on the "number of herbs peeled" are those counted per ten herbs attached to respective baked confectionery products.

TABLE 1

| Baked Confectionery Product | Color of Herbs | Fragrance of Herbs | Number of Herbs Peeled |
| --- | --- | --- | --- |
| A | bright green | fragrant with no grassy smell | 0 |
| B | slightly browned | fragrant with no grassy smell | 1 |
| C | dark brown | strongly grassy-smelling | 0 |
| D | dark brown | strongly grassy-smelling | 2 |
| E | bright green | fragrant with no grassy smell | 4 |

As is apparent from Table 1, the blanched herbs as used in the baked confectionery products A and B showed tendencies to be hardly browned and lose the grassy smell through or after baking as compared with the unblanched herbs as used in the baked confectionery products C and D. As is also recognizable from Table 1, the blanched, pullulan-coated and baked herbs as used in the baked confectionery products A as well as the blanched, pullulan-coated and unbaked herbs as used in the baked confectionery products E were the most desirable in color and fragrance.

As is further recognizable from Table 1, the herbs attached to the respective dough sheet units before baking were hardly peeled off the baked confectionery products. Among them, the pullulan-coated herbs attached to the respective dough sheet units before baking were the least liable to be peeled off the baked confectionery products. Thus, it can be concluded that the baked confectionery products A produced according to the process of the present invention involving blanching of herbs, pullulan-coating of the herbs and baking were endowed with the best characteristics.

Figure 2:
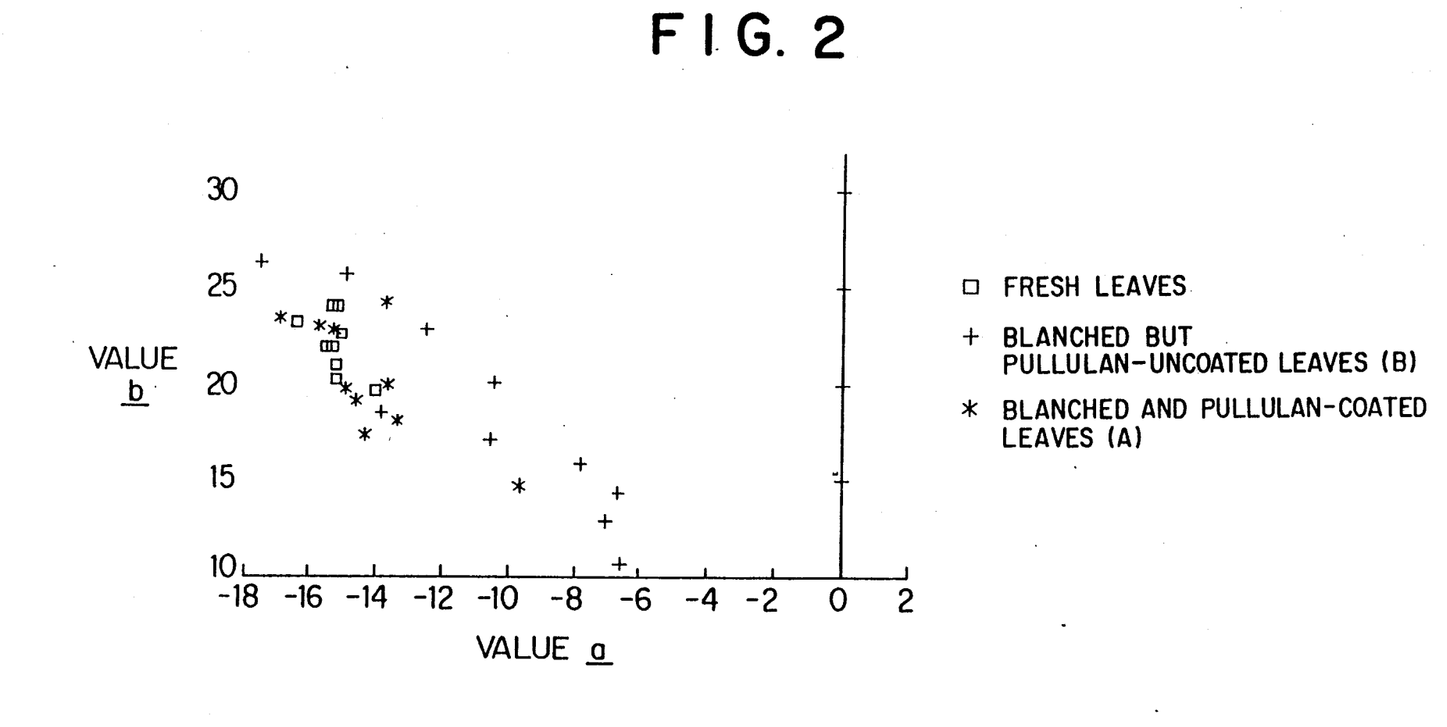
FIGS. 2 to 5 are diagrams illustrative of color tone distributions as to fresh herbs as well as herbs of baked confectionery products A to D produced in Examples.
Figure 3:
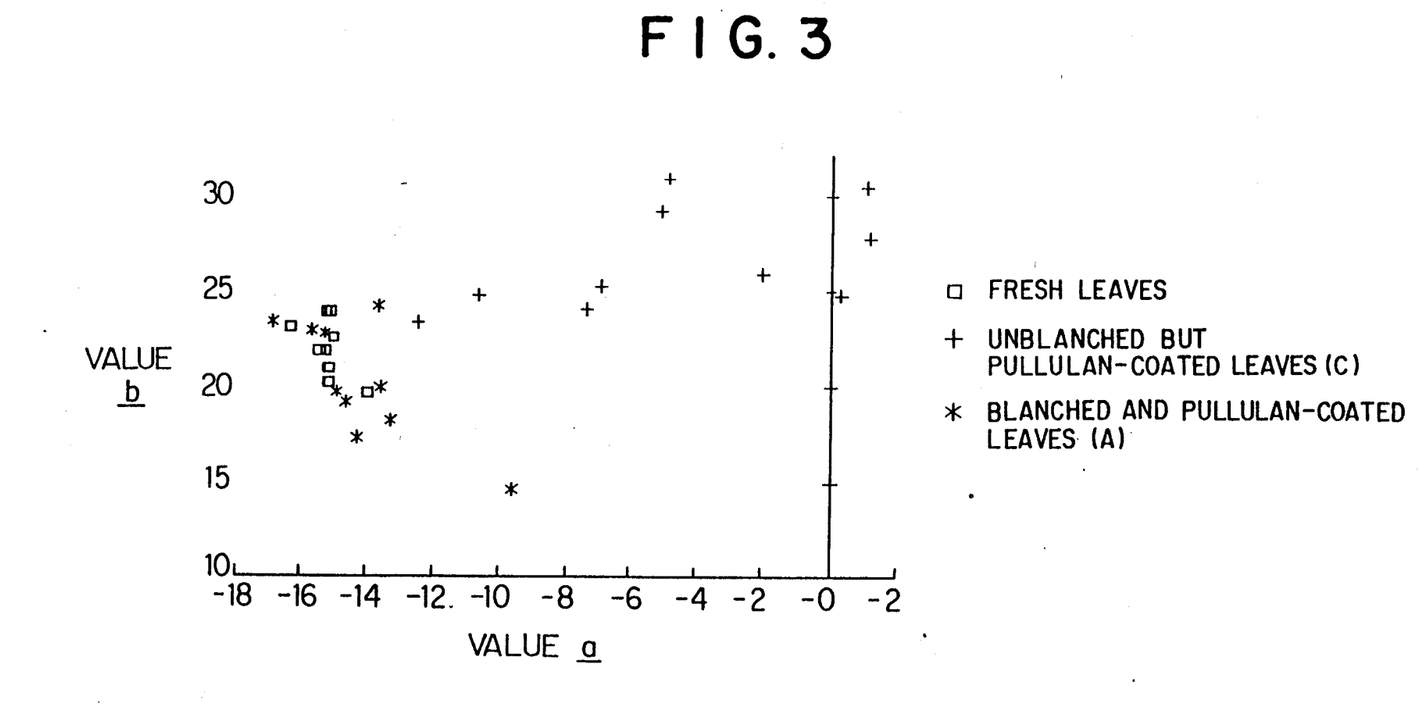
Figure 4:
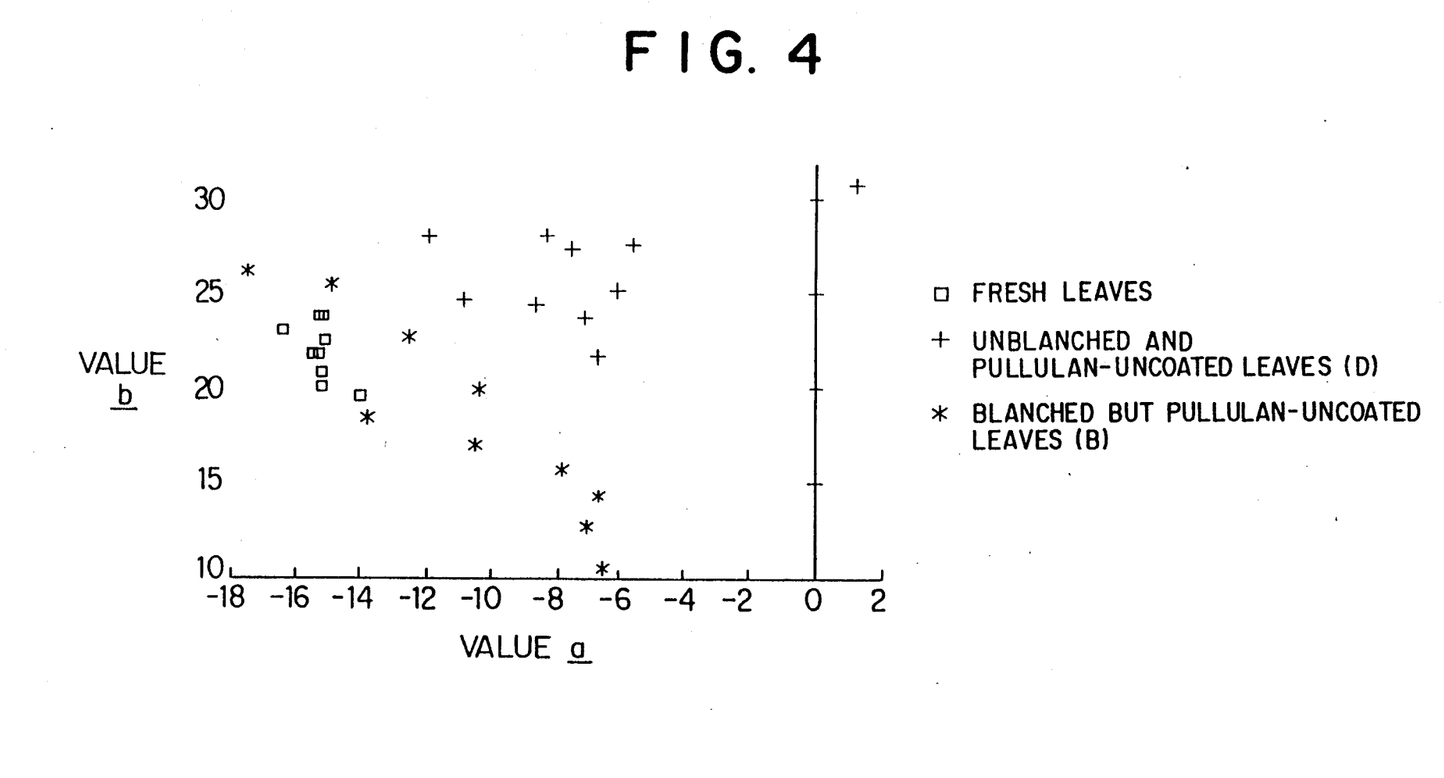
Figure 5:
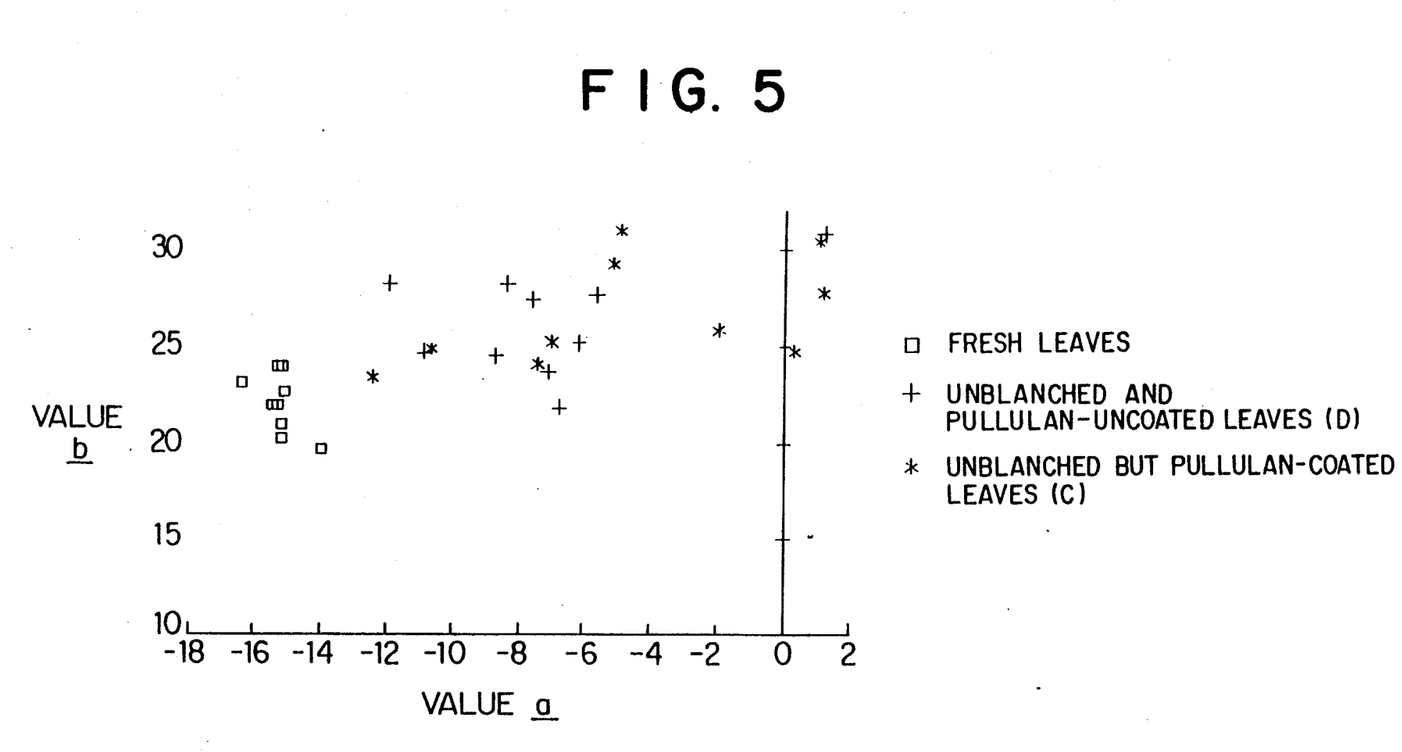

FIGS. 2 to 5 show color tone distributions with the abscissa and the ordinate representing the value a (the higher the value a, the more reddish the color tone, and the lower the value a, the more greenish the color tone) and the value b (the higher the value b, the more yellowish the color tone, and the lower the value b, the more bluish the color tone), respectively. In the figures, points in L.a.b. color solid, found through color measurement with a colorimetric color difference meter Model CR-200b (trade name of a product manufactured by Minolta Camera Co., Ltd.), are plotted, which are respectively assigned to 10 fresh lemon bahm leaves in a set and lemon bahm leaves each attached to the upper surface of a baked confectionery product in respective sets of ten corresponding to the baked confectionery products A to D. FIG. 2 shows a distribution of the color tones of the fresh lemon bahm leaves and those of the lemon bahm leaves respectively attached to the baked confectionery products A and B. FIG. 3 shows a distribution of the color tones of the fresh lemon bahm leaves and those of the lemon bahm leaves respectively attached to the baked confectionery products A and C. FIG. 4 shows a distribution of the color tones of the fresh lemon bahm leaves and those of the lemon bahm leaves respectively attached to the baked confectionery products B and D. FIG. 5 shows a distribution of the color tones of the fresh lemon bahm leaves and those of the lemon bahm leaves respectively attached to the baked confectionery products C and D.

As is recognizable from FIGS. 2 and 3, the blanched and pullulan-coated lemon bahm leaves were the closest in color tone to the fresh lemon bahm leaves. As is recognizable from FIG. 5, the unblanched but pullulan-coated lemon bahm leaves were more liable to be browned than the unblanched and pullulan-uncoated lemon bahm leaves. Thus, it can be concluded from the foregoing observations that the blanching and subsequent pullulan-coating treatments of herbs can bring about a synergistic effect of keeping the green color of the fresh herbs through and after baking, though the mere pullulan-coating treatment of herbs cannot be said to be an effective means for keeping the green color of the fresh herbs through and after baking.

EXAMPLE 2 (Layered dough sheet units)

Dry Type (spinach×oregano)

I. Preparation of Dough Sheet A (Pie Dough Sheet)

1,428 g of flour, 286 g of sugar, 29 g of powdered milk, 21 g of table salt, 71 g of butter, and 786 g of water were placed in the bowl of a mixer, and then kneaded together with a spiral dough hook. Thereafter, the resulting mixture was tempered in a refrigerator having an inside atmosphere kept at 5 ° C for one hour. The tempered mixture was taken out of the refrigerator, and then milled into a sheet having a thickness of 10 mm, on a ⅔ area of which 1,000 g of margarine was placed, followed by three cycles of a procedure of folding the sheet in three→tempering the folded sheet in the refrigerator having an inside atmosphere kept at 5° C. for 30 minutes→milling the tempered sheet into a sheet of 15 mm in thickness. Thereafter, the resulting sheet was folded in three to obtain a pie dough sheet having 81 layers. The water content of this pie dough sheet was 31.7 wt. %.

II. Preparation of Dough Sheet B

Spinach was dipped in boiling water for 30 seconds, then dipped in water kept at 15° C. for 10 minutes, and then passed throguh a colander to prepare pasty spinach, from which water was then squeezed out to obtain squeezed spinach in a yield of 22 wt. %. 620 g of the squeezed spinach was mixed with 700 g of flour, 300 g of an almond powder, 200 g of sugar, 600 g of margarine, 200 g of cream cheese, and 20 g of table salt according to the creaming method to obtain a dough sheet B, the water content of which was 33.5 wt. %.

III. Preparation of Dough Sheet Units

The above-mentioned dough sheets A and B were each rolled into respective sheets having a thickness of 5 mm. The rolled dough sheet B was placed on the rolled dough sheet A. Thereafter, they were folded together in three and rolled into a five-layered dough sheet having a thickenss of 2.5 mm and an A:B weight ratio of 2.8:1. The five-layered dough sheet was punched into circular sheet units having a diameter of 5.5 cm, through each of which 9 vents having a diameter of 1 mm were formed to prepare dough sheet units.

IV. Blanching Treatment of Herbs

A 0.3 wt. % aqueous solution of sodium bicarbonate (pH: 8.2) was boiled, in which 30 g of oregano leaves with sprigs were dipped for one minute to effect the blanching treatment thereof, immediately followed by dipping thereof in water kept at 13° C.

V. Attachment of Herbs to Dough Sheet Units

The upper surfaces of the above-mentioned dough sheet units were coated with a 33 wt. % aqueous solution of yolk. Thereafter, the oregano leaves from which water had been wiped away were respectively attached to central areas of the upper surfaces of the yolk-coated dough sheet units.

VI. Baking

Thereafter, the dough sheet units with an oregano leaf attached thereto were placed in an oven, baked at 180° C. for 10 minutes, and dried with hot air heated up to 100° C. for 60 minutes to produce baked confectionery products, the water content of which was 1.8 wt. %.

EXAMPLE 3 (Layered dough sheet units)

Wet Type (squash×lemon bahm)

I. Preparation of Dough A (Cracker Dough)

1,000 g of flour, 100 g of sugar, 20 g of table salt, 20 g of yeast, 500 g of butter, and 300 g of water were placed in the bowl of a mixer, and then kneaded together with a spiral dough hook. Thereafter, the resulting mixture was fermented at 27° C. for 1.5 hours to obtain a dough, the water content of which was 27.3 wt. %.

II. Preparation of Dough B

Squash was dipped in boiling water for 5 minutes, and then passed throguh a colander to prepare pasty squash. 800 g of the pasty squash was mixed with 500 g of a coconut powder and 1,100 g of sugar to obtain a dough B, the water content of which was 30.3 wt. %.

III. Preparation of Dough Sheet Units

Subsequently, the dough B milled into a sheet having a thickenss of 3 mm was sandwiched between two milled sheets of the dough A having a thickness of 1.5 mm, which were then lightly pressed to effect contact bonding therebetween. Thus, an three-layered dough sheet having a A:B weight ratio of 2.2:1 was formed. The three-layered dough sheet was punched into circular dough sheet units having a diameter of 3.5 cm.

IV. Blanching Treatment of Herbs

A 0.3 wt. % aqueous solution of sodium bicarbonate (pH: 8.2) was boiled, in which 30 g of lemon bahm leaves with sprigs were dipped for one minute to effect the blanching treatment thereof, immediately followed by dipping thereof in water kept at 13° C.

V. Attachment of Herbs to Dough Sheet Units

The upper surfaces of the above-mentioned dough sheet units were coated with a 33 wt. % aqueous solution of yolk. Thereafter, the lemon bahm leaves from which water had been wiped away were respectively attached to central areas of the upper surfaces of the yolk-coated dough sheet units.

VI. Baking

Thereafter, the dough sheet units with a lemon bahm leaf attached thereto were placed in an oven, and baked at 180° C. for 11 minutes to produce baked confectionery products, the water content of which was 15.3 wt. % and the water activity of which was 0.77.

EXAMPLE 4 (Layered dough sheet units)

Wet Type (Japanese radish×sweet marjoram)

I. Preparation of Dough A (Cracker Dough)

1,000 g of flour, 100 g of sugar, 20 g of table salt, 20 g of yeast, 500 g of butter, and 300 g of water were placed in the bowl of a mixer, and then kneaded together with a spiral dough hook. Thereafter, the resulting mixture was fermented at 27° C. for 1.5 hours to obtain a dough, the water content of which was 27.3 wt. %.

II. Preparation of Dough B 340 g of cream cheese and 340 g of Gouda cheese were decocted to be softened, and then mixed with 290 g of powdery cheese, 400 g of an almond powder, 100 g of sugar, 20 g of table salt and 800 g of grated and water-squeezed Japanese radish prepared in a yield of 27 wt. % to obtain a dough B, the water content of which was 47.9 wt. %.

III. Preparation of Dough Sheet Units

Subsequently, the dough B milled into a sheet having a thickenss of 3 mm was sandwiched between two milled sheets of the dough A having a thickness of 1.5 mm, which were then lightly pressed to effect contact bonding therebetween. Thus, an three-layered dough sheet having a A:B weight ratio of 2.2:1 was formed.

The three-layered dough sheet was punched into circular dough sheet units having a diameter of 3.5 cm.

IV. Blanching Treatment of Herbs

A 0.3 wt. % aqueous solution of sodium bicarbonate (pH: 8.2) was boiled, in which 30 g of sweet marjoram leaves with sprigs were dipped for one minute to effect the blanching treatment thereof, immediately followed by dipping thereof in water kept at 13° C.

V. Attachment of Herbs to Dough Sheet Units

The upper surfaces of the above-mentioned dough sheet units were coated with a 33 wt. % aqueous solution of yolk. Thereafter, two sweet marjoram leaves from which water had been wiped away were respectively attached to a central area of the upper surface of each of the yolk-coated dough sheet units.

VI. Baking

Thereafter, the dough sheet units with two sweet marjoram leaves attached thereto were placed in an oven, and baked at 180° C. for 11 minutes to produce baked confectionery products, the water content of which was 16.9 wt. % and the water activity of which was 0.80.

According to the process of the present invention for producing a baked confectionery product, the grassy smell of herbs can be eliminated thanks to the preliminary blanching treatment of the herbs, and discoloration, through and after baking, of the herbs hardly occurs as a result of coating the blanched herbs with an aqueous coating medium, while the herbs attached to baked confectionery products produced by the process of the present invention are hardly peeled off the products because the baking has been effected after attachment of the herbs to dough sheet units. The bright green color of the herbs adhering to the surfaces of the baked confectionery products provides the products with a beautiful appearance and a healthy touch. Furthermore, an unexpected combination of the baked confectionery products with the herbs is something out of the ordinary to arouse an appetite in consumers, while the combination of the taste, flavor and mouthfeel of the baked confectionery products with the refreshing fragrance of the herbs creates a novel nice savor.

In the case of layered, baked confectionery products produced by the process of the present invention, the dough A to form the uppermost and lowermost layers of the products can secure a beautiful browned color substantially without an undesirable savor attributable to scorched vegetables, while the layers thereof differing in color can provide a beautiful overall appearance. The dough B can provide a healthy touch by virtue of their high vegetable content. Furthermore, the undesirable dry mouth feel peculiar to the dough B can be offset by the desirable mouth feel of the dough A.

What is claimed is:

1. A process for producing a baked confectionery product with at least one green leaf attached thereto, comprising the steps of: (1) blanching at least one green plant leaf with an aqueous medium having a pH of 6.5 to 11 and heated at a temperature of 80° to 102° C.; (2) coating the surfaces of said at least one blanched, green plant leaf with an aqueous coating medium selected from the group consisting of an aqueous solution of 2 to 20 wt. % pullulan and an aqueous solution of 2 to 20 wt. % gelatin; (3) attaching said at least one blanched, green plant leaf to said dough sheet unit; and (4) baking said dough sheet unit with said at least one blanched, green plant leaf attached thereto.

2. A process for producing a baked confectionery product with at least one green leaf attached thereto as claimed in claim 1, wherein said at least one green plant leaf is dipped aqueous medium having a pH of 6.5 to 11 and heated at a temperature of 80° to 102° C. for 3 to 600 seconds to effect the blanching treatment thereof.

3. A process for producing a baked confectionery product with at least one green leaf attached thereto as claimed in claim 1, wherein said dough sheet unit is constituted of layers of a vegetable-free dough A including the uppermost and lowermost layers of said dough sheet unit, and at least one layer of a vegetable-containing dough B.

4. A process for producing a baked confectionery product with at least one green leaf attached thereto as claimed in claim 3, wherein said dough A is a member selected from the group consisting of a biscuit dough, a pie dough, and a cracker dough.

5. A process for producing a baked confectionery product with at least one green leaf attached thereto as claimed in claim 3, wherein the water content of said dough B is 10 to 50 wt. %.

6. A process for producing a baked confectionery product with at least one green leaf attached thereto as claimed in claim 3, wherein the weight ratio of said dough A:said dough B is in the range of 1:0.25 to 2.

* * * * *